B. A. JONASSON.
SMOKING-PIPE.
No. 189,105.  Patented April 3, 1877.
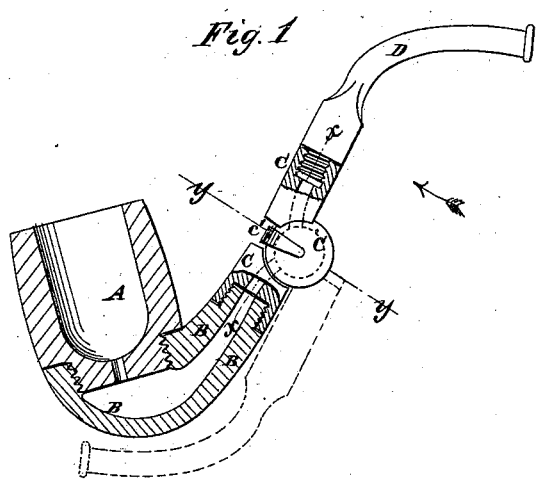
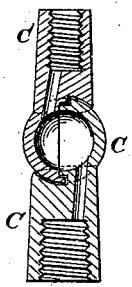
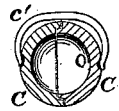
WITNESSES:
INVENTOR:
B. A. Jonasson
BY
ATTORNEYS.

UNITED STATES PATENT OFFICE.

BENGT A. JONASSON, OF WARREN, PENNSYLVANIA.

IMPROVEMENT IN SMOKING-PIPES.

Specification forming part of Letters Patent No. 189,105, dated April 3, 1877; application filed February 17, 1877.

*To all whom it may concern:*

Be it known that I, BENGT AUGUST JONASSON, of Warren, in the county of Warren and State of Pennsylvania, have invented a new and useful Improvement in Smoking-Pipes, of which the following is a specification:

Figure 1 is a side view of my improved pipe, partly in section to show the construction. Fig. 2 is a detail longitudinal section of the joint of the stem, taken through the line $x\ x$, Fig. 1. Fig. 3 is a detail cross-section of the joint, taken through the line $y\ y$, Fig. 1.

Similar letters of reference indicate corresponding parts.

The object of this invention is to furnish an improved smoking-pipe which shall be so constructed that it may be folded into small compass, so that it can be conveniently carried in the pocket, and which can be conveniently taken apart and cleaned when desired.

The invention will first be described in connection with drawing, and then pointed out in the claim.

A represents the bowl of the pipe, upon the bottom of which is formed a round tenon, having a screw-thread cut upon it to screw into the base B. The base B is made with a large cavity in its lower part to receive the moisture from the bowl A. The base B is provided with a shank to screw into the lower socket of the joint C. The joint C is made in the form of two half-spheres, one of which is rabbeted upon the outer side of its edge, and the other upon the inner side of its edge, so that the two edges may fit upon each other. The two parts of the joint C are held in place upon each other by an open-ring spring, $c'$, the ends of which rest in recesses in the outer sides of the two parts of the said joint, as shown in Figs. 1 and 3. D is the mouth-piece, which is screwed into the upper socket of the joint C. From one part of the joint C a passage leads through the lower socket, and from the other part a passage leads through the upper socket, for the passage of the smoke from the base to the mouth-piece.

With this construction the mouth-piece D can be turned down beneath the base B, as shown in dotted lines in Fig. 1. The base B and the mouth-piece D may be made of hard rubber or other suitable material.

Having thus described my invention, I claim as new and desire to secure by Letters Patent—

A folding smoking-pipe whose joint consists of two rabbeted hollow half-spheres and an open-ring spring-retainer, $c'$, arranged substantially as and for the purpose specified.

BENGT AUGUST JONASSON.

Witnesses:
ALEXR. H. MCKELVY,
JAMES C. WELLS.